(12) United States Patent
Herrmann

(10) Patent No.: US 10,779,237 B2
(45) Date of Patent: Sep. 15, 2020

(54) SHARING LOCATION DATA TO REDUCE POWER CONSUMPTION

(71) Applicant: Microsoft Technology Licensing, LLC, Redmond, WA (US)

(72) Inventor: Eric Manaolana Herrmann, Mill Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 16/164,493

(22) Filed: Oct. 18, 2018

(65) Prior Publication Data

US 2020/0128486 A1  Apr. 23, 2020

(51) Int. Cl.
*H04W 52/02* (2009.01)
*H04W 4/029* (2018.01)
*H04L 29/06* (2006.01)
*H04W 4/08* (2009.01)
(Continued)

(52) U.S. Cl.
CPC ....... *H04W 52/0235* (2013.01); *H04L 63/123* (2013.01); *H04W 4/029* (2018.02); *H04W 4/08* (2013.01); *H04W 4/023* (2013.01); *H04W 52/0219* (2013.01); *H04W 64/006* (2013.01); *Y02D 70/00* (2018.01)

(58) Field of Classification Search
CPC ... H04W 52/0235; H04W 4/08; H04W 4/029; H04W 4/023; H04W 64/006; H04W 52/0219; H04L 63/123; Y02D 70/00
See application file for complete search history.

(56) References Cited

U.S. PATENT DOCUMENTS

| 8,364,172 B2 | 1/2013 | Guanfeng et al. |
| 9,686,649 B2 | 6/2017 | Weizman et al. |
| 9,769,601 B2 | 9/2017 | Zelinka |

(Continued)

FOREIGN PATENT DOCUMENTS

| JP | 2010117241 A | 5/2010 |
| WO | 2016115242 A | 7/2016 |
| WO | 2017184616 A1 | 10/2017 |

OTHER PUBLICATIONS

Mair, et al., "A Collaborative Bluetooth-Based Approach to Localization of Mobile Devices," in 8th International Conference on Collaborative Computing: Networking, Applications and Worksharing, 2012, 9 pages.

(Continued)

*Primary Examiner* — Brian T O Connor

(57) ABSTRACT

A technique is described for assigning a location-finder role to a mobile computing device (a "location-finder device") within a spatially-clustered group of mobile computing devices. The location-finder device determines its location based on signals received from one or more external sources (such as a GPS system), to provide location data. The location-finder device then transmits a signal to other members of the group of mobile computing devices using a local communication channel (such as a BLUETOOTH communication channel). That signal conveys the location data. Each of the other members of the group uses the location data to define its position, in lieu of independently determining its own location from the external source(s). By virtue of this behavior, the other members can reduce their consumption of power.

18 Claims, 10 Drawing Sheets

(51) Int. Cl.
*H04W 4/02* (2018.01)
*H04W 64/00* (2009.01)

(56) References Cited

U.S. PATENT DOCUMENTS

| | | | |
|---|---|---|---|
| 10,368,185 B2* | 7/2019 | Arunkumar | H04L 63/1466 |
| 2013/0102352 A1* | 4/2013 | Mintah | H04L 45/04 455/519 |
| 2016/0269860 A1 | 9/2016 | Weizman et al. | |
| 2017/0093882 A1 | 3/2017 | Khuu et al. | |
| 2017/0303203 A1 | 10/2017 | Haro et al. | |
| 2017/0311228 A1* | 10/2017 | Zavesky | H04W 48/04 |
| 2018/0011197 A1 | 1/2018 | Waldman et al. | |
| 2018/0279096 A1* | 9/2018 | Wu | H04W 4/40 |
| 2018/0302751 A1* | 10/2018 | Coutinho | H04W 4/023 |
| 2018/0373268 A1* | 12/2018 | Antunes Marques Esteves | H04W 4/023 |
| 2018/0376290 A1* | 12/2018 | Dhillon | H04W 4/023 |
| 2019/0073676 A1* | 3/2019 | Wang | G06Q 20/405 |
| 2019/0204853 A1* | 7/2019 | Miller, Jr. | G05D 1/0257 |
| 2019/0230500 A1* | 7/2019 | Goncalves | H04B 7/0617 |
| 2019/0277972 A1* | 9/2019 | Carter | G01S 19/06 |
| 2019/0306680 A1* | 10/2019 | Doggart | H04W 4/08 |
| 2019/0387455 A1* | 12/2019 | Zavesky | H04W 48/04 |
| 2020/0092685 A1* | 3/2020 | Fehrenbach | H04B 7/15507 |

OTHER PUBLICATIONS

Huang, et al., "Energy Efficient and Accuracy Aware (E2A2) Location Services via Crowdsourcing," in 2013 IEEE 9th International Conference on Wireless and Mobile Computing, Networking and Communications (WiMob), 2013, 8 pages.

Cho, et al, "Measuring a Distance between Things with Improved Accuracy," available at <<https://www.sciencedirect.com/science/article/pii/S1877050915009199>>, in Procedia Computer Science, No. 52, 2015, 6 pages.

PCT Search and Written Opinion for PCT Application No. PCT/US2019/055752, including translation of Japanese Published Patent Application No. JP 2010 117241, dated Mar. 10, 2020, 35 pages.

Patent Abstracts of Japan, Publication No. 2010117241, Panasonic Corp., publication date of application: May 27, 2010, 1 page.

* cited by examiner

DELEGATION SCENARIO 3: LEADERLESS ALLOCATION STRATEGY

| | |
|---|---|
| STAGE 1 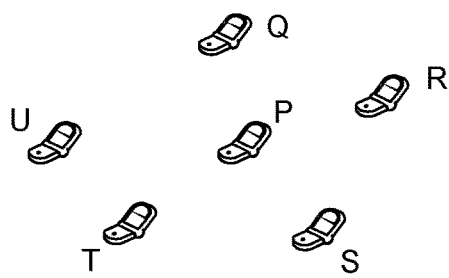 | EACH DEVICE CONTINUALLY DETERMINES ITS SUITABILITY SCORE. ITS SCORE DEPENDS ON ONE OR MORE FACTORS, INCLUDING THE TIME SINCE THE DEVICE LAST DETERMINED A LOCATION ITSELF. |
| STAGE 2 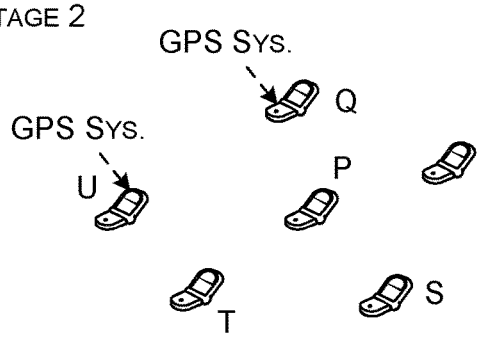 | EACH DEVICE DETERMINES ITS NEXT LOCATION AT A TIMING DETERMINED BY ITS SUITABILITY SCORE. HERE, DEVICES Q AND U ARE CURRENTLY DETERMINING THEIR LOCATIONS. |
| STAGE 3 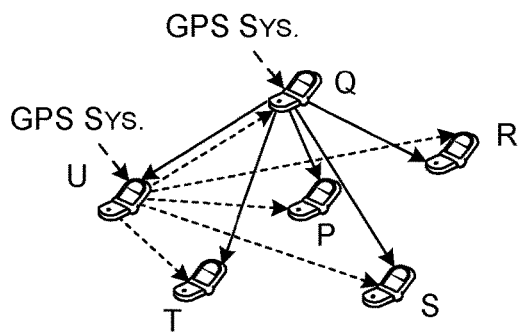 | EACH DEVICE REPORTS ITS LOCATION, ONCE DETERMINED. AT THIS MOMENT, DEVICES Q AND U ARE REPORTING THEIR LOCATIONS. |

FIG. 6

OVERVIEW OF OPERATION OF AN (OPTIONAL) LEADER MOBILE COMPUTING DEVICE
702

INTERACT WITH OTHER MEMBERS OF A SPATIALLY-CLUSTERED GROUP OF MOBILE DEVICES TO RECEIVE INFORMATION REGARDING SUITABILITY OF THE OTHER MEMBERS TO FUNCTION AS THE LOCATION-FINDER DEVICE.
704

MAKE AN ASSIGNMENT WHICH SELECTS THE LOCATION-FINDER DEVICE BASED ON THE INFORMATION THAT IS RECEIVED.
706

CONTROL A COMMUNICATION MECHANISM OF THE LEADER DEVICE TO TRANSMIT AN ASSIGNMENT-BEARING SIGNAL TO THE LOCATION-FINDER DEVICE USING A LOCAL COMMUNICATION CHANNEL, WHICH INFORMS THE LOCATION-FINDER DEVICE OF THE ASSIGNMENT.
708

FIG. 7

OVERVIEW OF OPERATION OF A LOCATION-FINDER MOBILE COMPUTING DEVICE
802

RECEIVE AN ASSIGNMENT WHICH CAUSES THE LOCATION-FINDER DEVICE TO BEGIN DETERMINING ITS LOCATION ON BEHALF OF MEMBERS OF A SPATIALLY-CLUSTERED GROUP OF MOBILE DEVICES, OF WHICH THE LOCATION-FINDER DEVICE IS ONE MEMBER, THE MEMBERS OF THE GROUP OF MOBILE DEVICES LYING WITHIN A TRANSMISSION RANGE ASSOCIATED WITH A LOCAL COMMUNICATION CHANNEL USED BY THE MEMBERS TO COMMUNICATE WITH EACH OTHER.
804

GENERATE LOCATION DATA BASED ON SIGNALS RECEIVED FROM ONE OR MORE EXTERNAL SOURCES (SUCH AS A GPS SYSTEM).
806

CONTROL A COMMUNICATION MECHANISM OF THE LOCATION-FINDER DEVICE TO TRANSMIT A LOCATION-BEARING SIGNAL TO OTHER MEMBERS OF THE GROUP OF MOBILE DEVICES USING THE LOCAL TRANSMISSION CHANNEL, THE LOCATION-BEARING SIGNAL CONVEYING THE LOCATION DATA. EACH OF THE OTHER MEMBERS USES THE LOCATION DATA RECEIVED FROM THE LOCATION-FINDER DEVICE IN LIEU OF INDEPENDENTLY DETERMINING LOCATION DATA BASED ON SIGNALS RECEIVED FROM THE ONE OR MORE EXTERNAL SOURCES. FURTHER, EACH OF THE OTHER MEMBERS CONSUMES LESS POWER BY VIRTUE OF USE OF THE LOCATION DATA RECEIVED FROM THE LOCATION-FINDER DEVICE, COMPARED TO AN AMOUNT OF POWER THAT WOULD BE OTHERWISE CONSUMED BY INDEPENDENTLY DETERMINING THE LOCATION DATA.
808

FIG. 8

SHARING LOCATION DATA TO REDUCE POWER CONSUMPTION

BACKGROUND

Mobile devices use various techniques to determine their respective locations. For example, a mobile device can determine its location based on signals transmitted by satellites associated with the Global Positioning System (GPS). Alternatively, or in addition, the mobile device can determine its location based on signals transmitted by various terrestrial sources having known locations, such as WI-FI access points, or cell phone towers. Different location-determination techniques provide location data having different respective accuracies. For example, after an initial period of initialization or "warm up," a mobile device can typically determine its location within a few meters using GPS signals. The device produces considerably less accurate readings based on signals received from terrestrial sources. Different location-determination techniques also have different respective power requirements. For instance, a mobile device may consume a relatively large amount of power by making frequent GPS-based location readings. This has the negative consequence of quickly depleting the mobile device's battery.

Different applications have differing requirements with respect to location data. For instance, a map-based navigation application may demand precise location data on a relatively frequent basis. A calendar application may require less precise and/or less frequent location measurements. Still other applications have no need for location data. Therefore, the power drain incurred by location measurements can affect different applications to differing extents. It can significantly impact the utility of any high-consumer of location data, such as navigation applications.

SUMMARY

A technique is described herein for assigning a location-finder role to a mobile computing device (a "location-finder device") within a spatially-clustered group of mobile computing devices. The location-finder device determines its location based on signals received from one or more external sources (such as a GPS system), to provide location data. The location-finder device then shares the location data with other members of the group of mobile computing devices using a local communication channel (such as a BLUETOOTH communication channel). Each of the other members of the group uses the location data to define its position, in lieu of independently determining its own location from the external source(s). By virtue of this behavior, the other members can reduce their consumption of power.

According to another illustrative aspect, one or more mobile computing devices in the group makes the assignment. By virtue of this aspect, the mobile computing devices can determine their approximate locations without relying on a remotely located system. This behavior is advantageous because the remotely located system may not be accessible at all times.

According to another illustrative aspect, the mobile computing devices can share location data in an anonymous manner, e.g., without revealing the identities of their users. This feature helps preserve the privacy of participants of the technique.

According to another illustrative aspect, the technique can make the assignment based on one or more input factors. For example, the technique can make the assignment based on a consideration of: an extent to which each mobile computing device relies on location data to perform one or more application and/or operating system functions; and a kind (e.g., precision) of location data that each mobile computing device relies on in performing these functions. Alternatively, or in addition, the technique can make the assignment based on any of: reliability of location data generated by each mobile computing device; a power level of each mobile computing device; system capabilities and/or constraints associated with each mobile computing device; user preferences associated with each mobile computing device; the amount of time that each mobile computing device has been a member of the group, and so on.

According to another illustrative aspect, any mobile computing device that receives shared-location data can also test its trustworthiness prior to consuming it. For example, a recipient of shared-location data can consider an extent to which the sender of the shared-location data is known to it, the consistency of the shared-location data with respect to expectations regarding current location, etc.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4-6 show three illustrative and non-limiting protocols for use by the communication environment of FIG. 1.

FIG. 7 is a flowchart that shows one manner of operation of a leader mobile computing device. The (optional) leader mobile computing device manages a group of mobile computing devices.

FIG. 8 is a flowchart that shows one manner of operation of a location-finder mobile computing device. The location-finder mobile computing device is a mobile computing device that has been assigned the task of generating location data on behalf of other members of a group of mobile computing devices.

Figure 1:
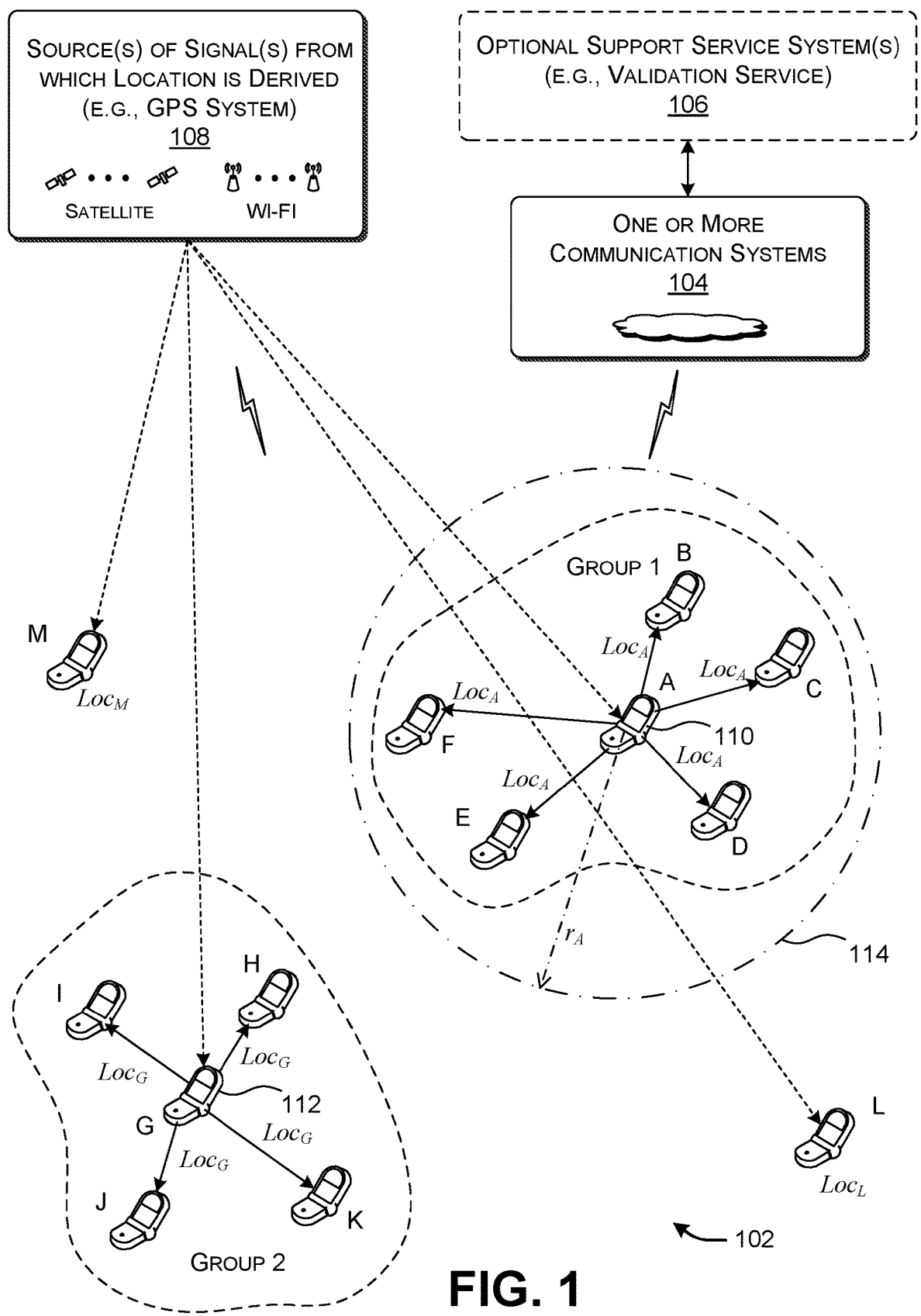
FIG. 1 shows a communication environment in which selected mobile computing devices generate location data and share that data with other mobile computing devices.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a communication environment for sharing location data among mobile computing devices, in lieu of requiring every mobile computing device to generate its own location data. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. The term "component" or "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Communication Environment

FIG. 1 shows a communication environment 102 in which a subset of mobile computing devices are chosen to determine their locations, and then share those locations with the remainder of the mobile computing devices. This eliminates the need for every mobile computing device to determine its own location. By virtue of this technique, the communication environment 102 reduces its overall power consumption. In those cases in which the selected mobile devices determine high-precision locations (e.g., using signals transmitted by a GPS system), the technique also increases the precision with which each mobile computing device can determine its respective location (e.g., compared to using signals sent by WI-FI access points or cell phone towers).

Each mobile computing device can correspond to any mobile device that performs a computing function of any kind. For example, it can correspond to, without limitation, a smartphone, a tablet-type computing device, a laptop computing device, a vehicle-borne computing device, a wearable computing device, a book reader device, a mixed reality device, etc. To simplify the explanation, each mobile computing device will be referred to as simply a "mobile device." A device which performs the role of determining its location and sharing it with others is referred to as a "location-finder device." A device which performs the role of managing a group of mobile devices (such as by selecting a location-finder device) is referred to herein as a leader device.

One or more communication systems 104 provide a communication service (or services) to the mobile devices. The communication systems 104 may correspond to different cellular network platforms provided by different respective commercial entities. Each cellular network platform can include one or more base stations, one or more cell towers, etc. The communication systems 104 may interact with one or more support service systems 106 which perform any environment-specific data processing functions, etc. The support service systems 106 can be implemented by one or more servers.

In one implementation, the location-sharing technique described herein works across different communication systems 104 associated with different communication providers. It also accommodates mobile devices running different respective operating systems (OSs), and different versions of each operating system. This makes the technique platform agnostic, OS-agnostic, version-agnostic, and hardware-agnostic.

FIG. 1 also generally shows one or more sources 108 of signals from which location is derived. For example, the sources 108 may include a set of Global Positioning System (GPS) satellites and associated equipment which provide GPS signals. The sources 108 may also include a set of WI-FI access points. The sources 108 may also include a set of cell phone towers. The cell phone towers correspond to part of the communication systems 106. A database (not shown) stores the known locations of the WI-FI access points and cell phone towers.

In the illustrative scenario shown in FIG. 1, a mobile device A (110) serves as location-finder device for group 1. Group 1 includes mobile devices A, B, C, D, E, and F. A mobile device G (112) serves as a location-finder device for Group 2. Group 2 includes mobile devices H, I, J, and K. At the present time, a number of other mobile devices are not members of any group, including mobile devices M and L.

Mobile device A (110) receives wireless signals from the one or more sources 108. It generates location data ($Loc_A$) based on these signals. For example, the mobile device A (110) may use an internal GPS location-determination mechanism to compute the location data based on GPS signals received from a GPS system's satellites. The mobile device A (110) thereafter uses a local communication channel to transfer the location data ($Loc_A$) to each of the other mobile devices (B, C, D, E, and F) in Group 1. In one non-limiting implementation, the communication channel corresponds to a BLUETOOTH Low Energy (BLE) channel. BLE involves exchange of radio signals having a frequency of 2.4 GHz in the unlicensed industrial-scientific-medical (ISM) band. Similarly, the mobile device G (112) computes location data ($Loc_G$) based on wireless signals transmitted by the one or more sources 104, and thereafter transfers this location data to the members of Group 2 using the local communication channel. The mobile devices M and L also generate their own location data based on signals from the source(s) 108, but, in their current states, do not transfer this data to any other mobile devices in the communication environment 102. Any member of a group that receives location data from another member of the group uses it as a proxy for its own location.

The generation of location data is a relatively expensive task from the standpoint of power consumption. Therefore, any mobile device that receives location data from another member of its group, in lieu of calculating its own location data, will reduce its consumption of power supplied by its battery. The above-summarized technique will likewise reduce the aggregate consumption of power in the communication environment 102.

Each group has a restricted spatial scope determined, in part, by the limitations of the local communication channel used to exchange wireless signals within the group. For example, BLE has a range of about 100 m. Hence, if the mobile device A (110) is considered the center of Group 1, a radius $r_A$ of about 100 meters defines the outer bounds 114 of its geographic scope. Other implementations can use other communication channels (such as WI-FI) to handle inter-device communication. These other implementations will establish groups of correspondingly different scopes.

Different implementations of the communication environment 102 can use different respective techniques to set up and manage groups. Broadly, in some implementations, the mobile devices cooperatively set up and manage the groups through the exchange of signals. In other implementations, the groups emerge as a consequence of the location-sharing technique, and do not require any formal negotiation among the mobile devices. In either case, the mobile devices can establish groups as a local operation without involvement of the communication systems 104 or other remotely-located controllers.

The mobile devices can ensure a resilient and reliable location-sharing service by reducing (or eliminating) reliance on logic implemented by a remote system. For instance, the mobile devices can provide its service even when its mobile devices cannot communicate with their respective communication systems 104. But the use of remotely-located logic is not precluded by the technique; in other implementations, for instance, the communication environment 102 can use remote resources to perform any of: exchanging of messages among mobile devices in the groups; establishing and maintaining the groups; providing assistance in determining the reliability of mobile devices and associated users; choosing the location-finder mobile devices for respective groups, and so on.

The explanation below will set forth illustrative examples of protocols by which the mobile devices can establish groups and choose location-finder computing devices. By way of preview, in one strategy, a leader device interacts with in-range mobile devices to determine their suitability to the role of location-finder. It then assigns one of the mobile devices (including possibly itself) the role of location-finder within a group. Thereafter, the location-finder mobile device will generate location data and share it with other members of its group. In another strategy, each mobile device determines its next location and propagates its next location at a prescribed timing. That timing reflects the mobile device's self-assessment as to its suitability for assuming the role of a location-finder device, relative to other mobile devices. The timing also dynamically varies depending on the time at which the mobile device last sent location data to other mobile devices.

Figure 2:
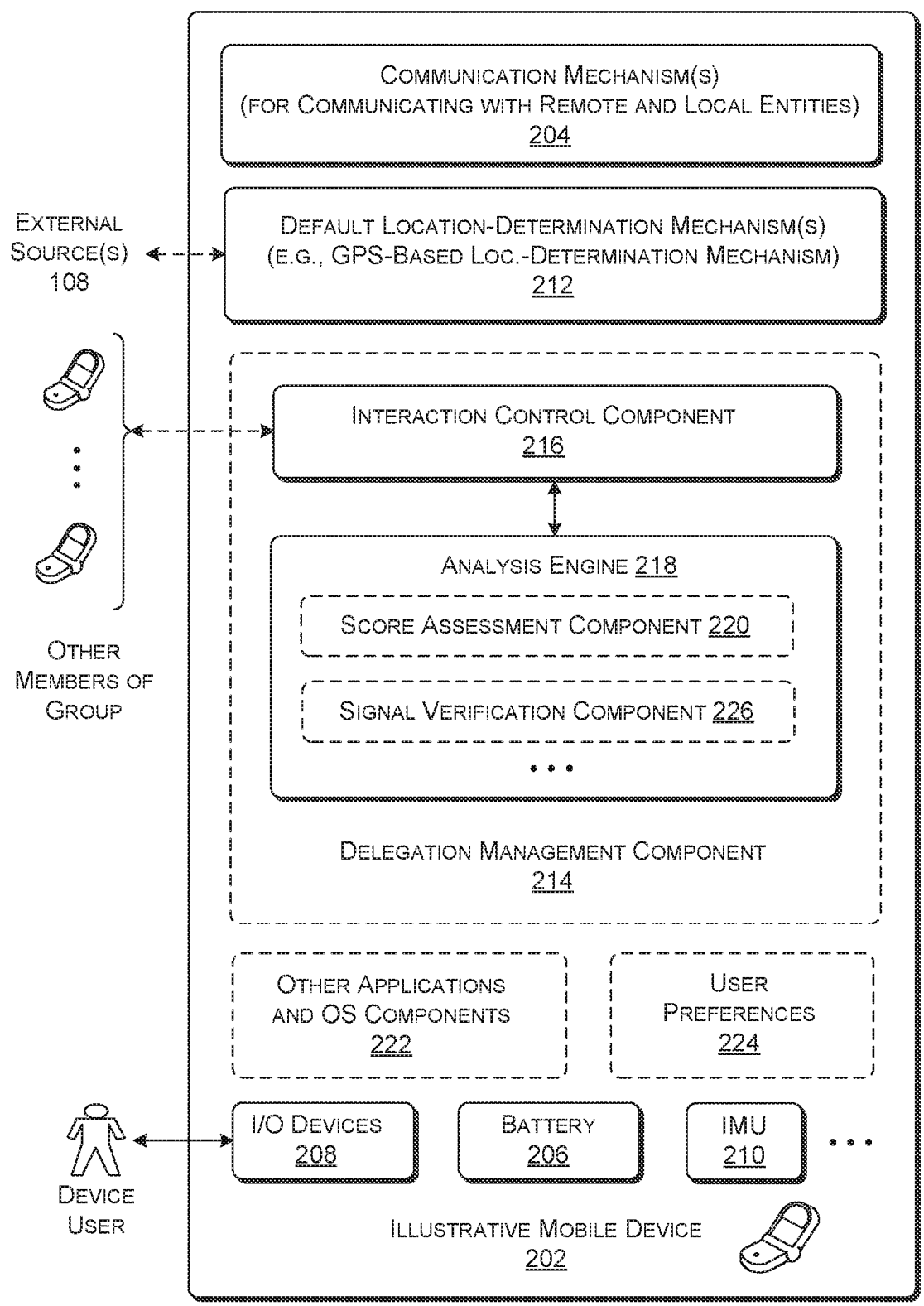
FIG. 2 shows one illustrative mobile computing device for use in the communication environment of FIG. 1.

FIG. 2 shows one illustrative mobile computing device ("mobile device") 202 of the communication environment 102 of FIG. 1. The mobile device 202 includes one or more communication mechanisms 204 for handling wireless interaction with various external entities. Each communication mechanism can include a wireless transmitter and/or receiver for transmitting/receiving wireless signals within a specific communication band and subject to a specific communication protocol. The mobile device 202 also includes a battery 206 which supplies power to the mobile device 202, input and output devices (I/O devices 208), and an inertial measurement unit (IMU) 210. The I/O devices 208 can include a display device, a speaker, a touch-sensitive display surface, a microphone, a camera, etc. The IMU 210 can include one or more accelerometers, one or more gyroscopes, one or more magnetometers, etc.

The mobile device 202 can include hardware logic circuitry (described in Section C) for implementing various functions. For instance, one or more default location-determination mechanisms 212 enable the mobile device 202 to determine its location based on wireless signals transmitted by the external source(s) 108, to provide location data. For example, one such default location-determination mechanism can use triangulation to determine the position of the mobile device 202 based on GPS signals received from a GPS system. Another default location-determination mechanism can use triangulation to determine the position of the mobile device 202 based on WI-FI signals received from WI-FI access points having respective known positions, etc.

A delegation management component 214 handles various aspects of the mobile device's participation in the location-sharing technique described above with respect to FIG. 1. For instance, the delegation management component 214 includes an interaction control component 216 which handles interaction between the mobile device 202 and other members of a group, e.g., for the purpose of setting up the group. In one implementation, the interaction control component 216 sends wireless signals using the local transmission channel, each of which specifies an app ID. The app ID identifies that the signals it sends are associated with the delegation management component 214. A recipient mobile device can use this app ID to discriminate messages sent by the delegation management component 214 from other BLUETOOTH signals sent by other applications and devices.

Further, in one implementation, the interaction control component 216 can send signals that do not reveal the identity of a user which sent the message. In this sense, the interaction control component 216 accommodates the anonymous exchange of information. However, in some implementations, a sender of a message can supply an app-assigned participant ID which uniquely identifies the sender for at least the limited purpose of participation in the location-sharing technique described herein. But the technique does not otherwise provide detailed canonical information which identifies the user or his or her devices. That is, the technique does not reveal the name, account number, manufacturer-assigned ID, etc. associated with the user and his or her device. Further, in some implementations, the sender can append a participant ID which specifies a target recipient of the message. The recipient can notify the sender of its participant ID in a prior message.

An analysis engine 218 performs various analysis tasks involved in the location-sharing technique. For example, a score assessment component 220 performs the task of determining the suitability of a mobile device (either the mobile device 202 or one or more other members of its group) for assuming the role of location finder.

The mobile device 202 can also host one or more other applications and operation system (OS) components 222 that perform any functions. A subset of these other applications and OS components 222 may require the use of location data to perform their respective functions. For example, a navigation application may require relatively precise GPS location data every 30 seconds to provide reliable driving directions to the user.

The mobile device 202 can also store information regarding the user's preferences 224 (where the "user" corresponds to the person who owns or otherwise controls the mobile device 202). One such preference may indicate extent of the user's willingness to participate in the location-sharing technique described above. That preference can be expressed as a variable having a binary (yes/no) value or variable which accepts three or more values (or a continuous range of values). Or the user can opt in to various aspects of the location-sharing technique, but not others.

Figure 3:
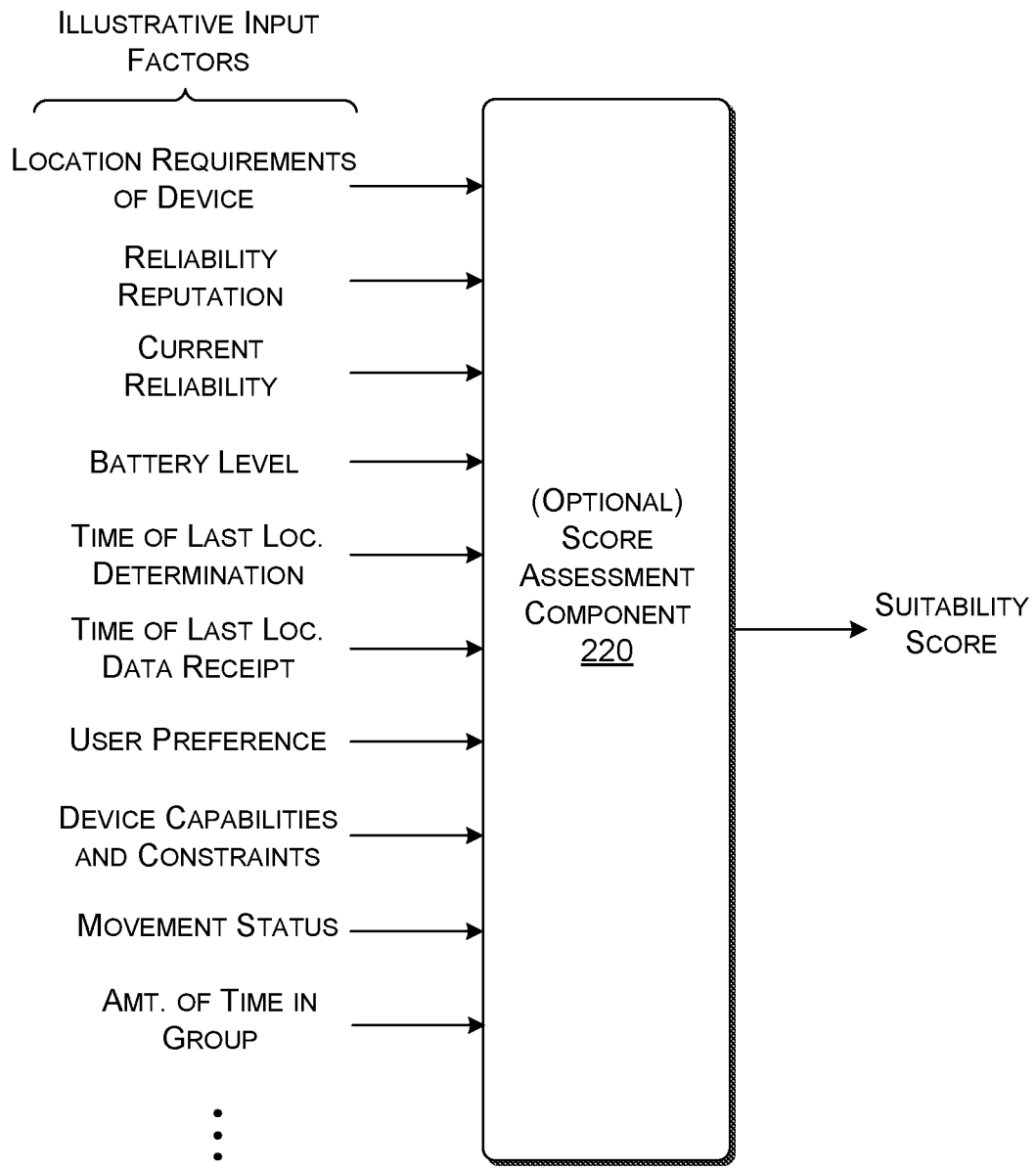
FIG. 3 shows an optional score assessment component for use in the mobile computing device of FIG. 2.

FIG. 3 shows an optional score assessment component 220 for use in the mobile device of FIG. 2. In one implementation, the score assessment component 220 generates a suitability score which reflects the suitability of the mobile device 202 to assume the role of location finder. In another case, the score assessment component 220 determines the suitability of one or more other computing devices to assume the role of location finder. Assume below that the former scenario applies. In either case, the score assessment component 220 generates the suitability score based on one or more input factors which have a bearing on the device's suitability to assume the role of location finder.

One input factor that has a bearing on suitability is the location requirements of the other applications and OS components 222 that are currently running (or installed) on the mobile device under consideration. More specifically, this input factor identifies the extent to which each such application or OS component requires the use of location data, and the type of location data that the application requires. The type of location data refers principally to the required degree of precision associated with the location data. The extent of reliance on the location data refers to the frequency at which the application or OS component requires the location data, and/or other contextual factors which pertain to its consumption of location data. The score assessment component 220 takes the location-based needs of its applications and OS components 222 into consideration based on a rule which posits that it is best to assign the role of location finder to the mobile device that places the most stringent demands on the consumption of location data. This assignment will best assure that the mobile device acquires the location data in a reliable manner. Further, this assignment reflects the premise that such a mobile device will, as a default, generate location data itself if it cannot obtain this data from any other source(s). The score assessment component 220 can increase the importance of this input factor for an application or logic component that is currently running, rather than merely installed on the mobile device. The score assessment component 220 can also weight this input factor based on a consideration of the level of importance that a user attributes to the application or logic component under consideration, which may be revealed in the user's preference information, application use history, etc.

Another input factor that plays a role is the reliability at which the mobile device under consideration is capable of detecting location data. This input factor, in turn, can have multiple components. For instance, this input factor can reflect one or more observed conditions that impact the mobile device's current ability to provide reliable location data. Such empirical conditions can include the current strength (and noise-related quality) of the mobile device's received signal from a cell phone tower, an indication that the mobile device is currently located in a region or building or enclosure that has poor coverage from a communication system, an indication that the mobile device is operating in a mode or state which compromises its interaction with a communication system, etc.

The reliability of a mobile device also depends on its reputation for providing accurate (and/or inaccurate readings). The reliability of a mobile device can also implicate the reputation of the user who owns or otherwise controls it. More specifically, the reputation of the device (and its user) can depend on any combination of at least: the device's history of providing accurate location data; the identity of the user; the identity of the application or OS component for which location data is being generated; the current location of the mobile device, and so on. The score assessment component 220 can receive the reputational information from various sources, such as a verification service provided by the support service system(s) 106. In one implementation, the score assessment component 220 can consult the verification service based on device ID information associated with the mobile device under consideration; this ID information may reveal the assigned identity of a mobile device within the limited context of the location-sharing technique, but not otherwise reveal the actual (canonical) identity of the mobile device or its user. In addition, or alternatively, the score assessment component 220 can consult pre-stored reputation information provided by the mobile device. For example, the mobile device can store a certificate previously provided by a verification service that conveys a level of trust associated with the mobile device. In general, the score assessment component 220 will discount the mobile device as a candidate for role of location finder in proportion to any derogatory information regarding its currently observed reliability and/or its reputational reliability.

The input factors can also describe the current battery level of the mobile device. The score assessment component 220 will decrease a mobile device's assessed suitability as its battery level decreases. This will avoid assigning a mobile device the power-intensive task of calculating location data if its battery level is relatively low.

Another input factor is user preferences. The mobile device may locally store the user's preferences 224. Alternatively, or in addition, the score assessment component 220 can consult a user profile provided in one of the support service system(s) 106 to obtain preference information. The score assessment component 220 can negatively weight a mobile device in proportion to a preference value specified by a user which reflects his or her willingness to take part in the location-sharing service. In some cases, the score assessment component 220 can honor the user's preferences by outright excluding the mobile device from serving as a location finder. In other cases, the preference information may describe the user's desires in a context-sensitive manner. For example, a user may indicate that he or she prohibits participation in the location-sharing service in some contexts but not others. The user can specify context along any number of dimensions, such as location, time, network traffic conditions, application being run, etc. Here, the score assessment component 220 assesses a current context, and discounts (or bolsters) a mobile device under consideration by an amount specified by whatever preference information applies to the current context.

One or more other input factors pertain to the capabilities and constraints associated with the mobile device itself or the device's technical environment. For example, these input factors can describe the accuracy with which the mobile device's hardware and/or software can determine locations. It can also describe any constraints a communications platform may place on interaction with the location-sharing service. In general, the score assessment component 220 can discount a mobile device which constrains its ability to function as a generator of location data, relative to other mobile devices that have no such limitations.

Another of the input factors is movement status, which may indicate whether the mobile device is moving, where it is moving to, and how it is moving. The score assessment component 220 can disfavor any mobile device that is quickly moving based on the premise that it may not be a stable member of the group. The score assessment 220 can give a particularly low score to the mobile device in those circumstances in which there is evidence that the mobile device is moving in a direction that is not in unison with other members of its group.

Another input factor is the amount of time that the mobile device has been a member of the group. The score assessment component 220 can positively favor a mobile device in proportion to the amount of time it has been a member of the group. The score assessment component 220 applies this rule based on the premise that the probability of a mobile device's continued membership in a group rises in proportion to the amount of time it has already spent as a member of the group. As already pointed out above, the score assessment component 220 favors mobile devices that represent stable members of a group.

Other input factors may play a role in some protocols but not others. For example, in some protocols (described below), the score assessment component 220 can dynamically adjust the suitability score based on the last time the mobile device last generated its own location data. It can also dynamically adjust the suitability score based on the last time that the mobile device last received location data from another mobile device in its group. The significance of these input factors will be clarified in the description (below) of FIG. 6.

The above-described input factors are described in the spirit of illustration, not limitation. Other implementations can adopt yet other types of input factors not described above, and/or omit one or more input factors described above.

The score assessment component 220 can generate the suitability score based on any logic. For example, in one case, the score assessment component 220 can generate the suitability score as a weighted sum of the above-described input factors (wherein each input factor can be converted into a value within a range or a binary value based on predetermined mapping rules). In another implementation, the score assessment component 220 can apply an environment-specific set of rules to generate the suitability score based on the above-described input factors. In another implementation, the score assessment component 220 can apply a machine-trained model to generate the suitability score. The machine-trained model can correspond to a linear classifier model, a support vector machine (SVM) model, a decision tree model, a neural network model of any type, etc.

Although not shown, another analysis component provided by the analysis engine 218 can compare the suitability scores associated with plural members of a group. This analysis component may be referred to as a device-comparison component. The device-comparison component can perform this task by choosing the mobile device having the highest suitability score. The device-comparison component can use any tie-breaking rule if there are two or more mobile devices with the top suitability score, e.g., by randomly choosing one of the mobile devices.

In another implementation, the device comparison component can determine the mobile device that is most suitable based on the raw input factors described above, associated with each of the candidate mobile devices. In this case, the communication environment 102 can optionally forego calculating individual suitability scores associated with each candidate mobile device.

A signal verification component 226 determines a level of trust regarding location data received from a location-finder device. The signal verification component 226 can leverage any of the input factors described above to make this determination. In other words, the input factors were described above in the context of deciding what mobile device to choose as a location finder. This is an assignment-related task. Assume now that a location-finder device has already been assigned and is sharing location data. The signal verification component 226 can use any of the input fact s described above to determine whether the mobile device 202 should accept the location data shared by the location-finder device. This pertains to a signal consumption-related task.

For instance, the signal verification component 226 can assess the reliability of the location data based on evidence regarding: (a) the trustworthiness of the sender (to the extent known); (b) the measured strength and noise-related quality of the signal which conveys the location data over a span of time; (c) the extent to which the location data agrees with expectations about where the recipient mobile device believes it to be located; (d) the amount of time that the sender has been a part of the group; (e) the current location and/or time at which the location data is received, and so on.

The signal verification component 226 can use any of the techniques described above to compute a trust score, such as by computing a weighted sum of the different input factors, using a machine-trained classification model, etc. The mobile device 202 can reject a signal if the trust score does not satisfy a prescribed trust threshold.

Different implementations can place different emphases on the frontend analysis which goes into choosing a location finder, compared to the receiver-end analysis that goes into determining whether received location data is trustworthy. On one end of the spectrum, the technique can employ frontend analysis, but no receiver-end analysis. On the opposite end, the technique can rely exclusively on receiver-end analysis. Other implementations can perform both analyses.

One input factor that a recipient mobile device may find particularly useful in assessing the trustworthiness of shared-location data is whether the sender of the location data is known to the recipient. In one implementation, users can convey this information without exposing their actual canonical identifies. For instance, a backend support service system can provide trusted certificates to participants of the location-sharing technique, upon their request. A recipient mobile device can assess whether shared-location data is reliable if it is accompanied by a trusted certificate. In another case, a location-finder mobile device can share encrypted information which reveals its true identity. A recipient mobile device can decode this encrypted information if it has been given the appropriate key to do so, upon which it can discover that it knows the entity who has sent the location data. The recipient mobile device can expose the results of its decryption (indicating whether the sender of the shared-location data is known or unknown) without revealing the content of the decrypted identity.

Also useful is the location-finder device's history of providing accurate location data, and the extent to which there is evidence that the currently-shared-location data is incorrect. For example, the recipient location device can discount shared-location data if the location finder has given erratic readings in a recent prior span of time, or if the currently shared location places the recipient mobile device in a location that is far away from a region specified by a series of recent prior readings.

Figure 4:
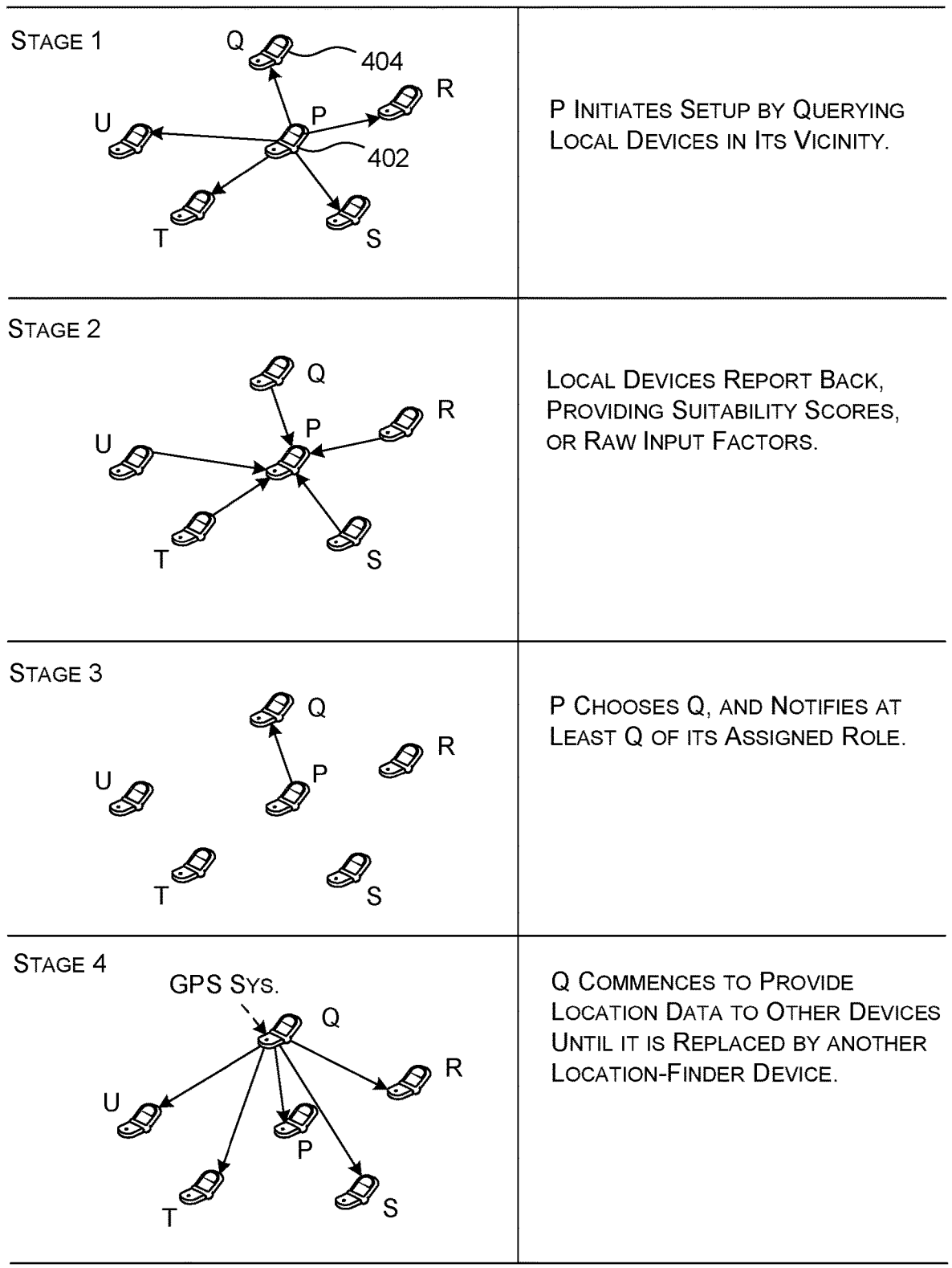
Figure 5:
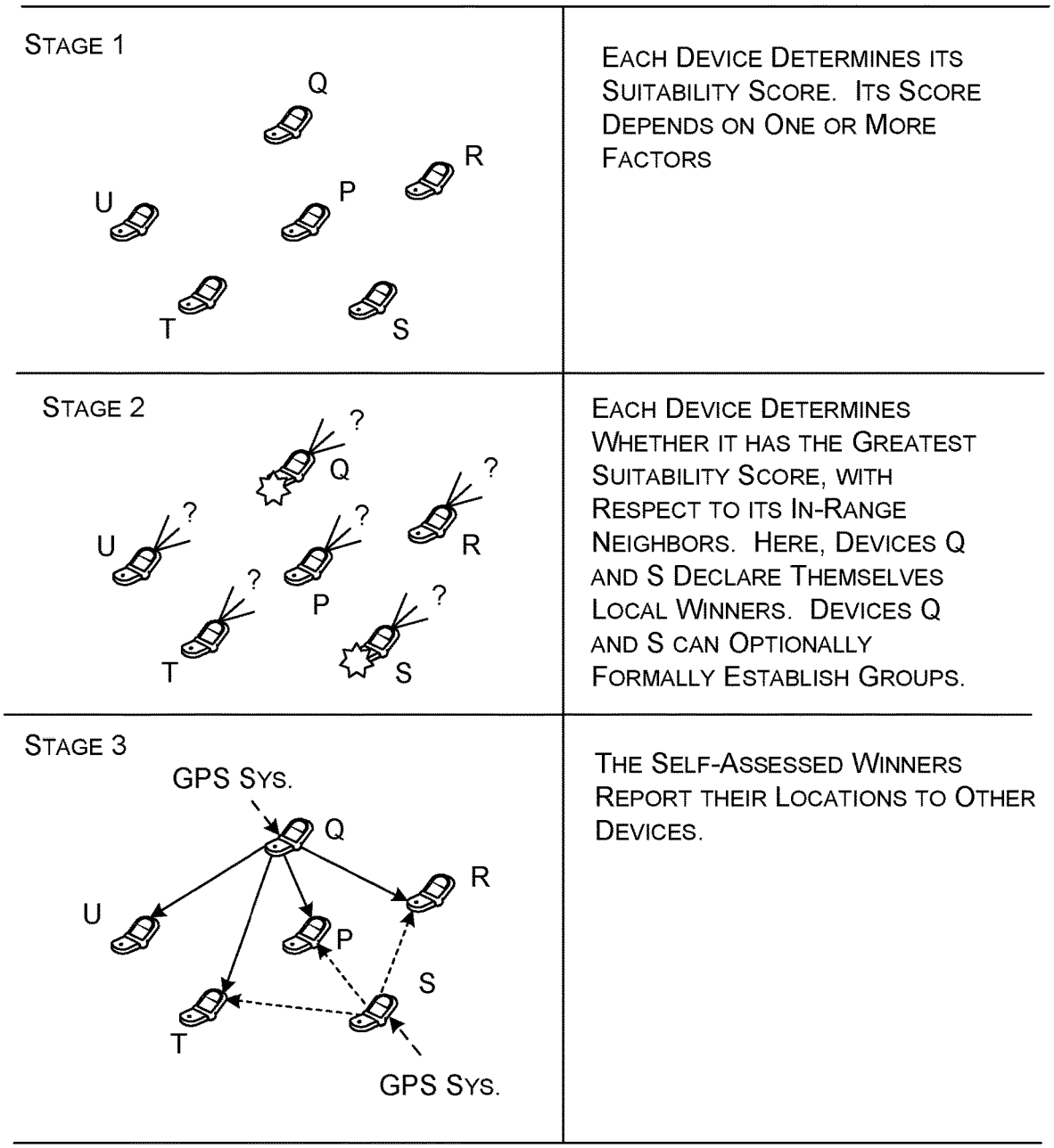

FIG. 4-6 show three respective strategies for choosing and deploying a location-finder device. In all strategies, the mobile devices communicate with each other using a local communication strategy, such as BLE.

Beginning with FIG. 4, this figure describes a requester-driven setup. In this case, any mobile device in an environment can serve as a leader which sets up a group. Here, assume that the leader corresponds to leader device P (402). The user of this device desires to participate in the location-sharing technique to conserve mobile device P's battery usage and/or to achieve some other objective. Alternatively, or in addition, the leader device P may correspond to a device which meets certain criteria. For example, the leader device P may correspond to a device of a certain type which makes it a good candidate as leader, such as a most recent version of device hardware or a most recent version of an operating system. In this case, the mobile device P may automatically initiate the location-sharing technique without explicit instruction from its user. Alternatively, or in addition, the mobile device P may automatically initiate the location-sharing technique when it experiences certain operating conditions, such as a low battery condition, or the failure to receive reliable GPS signals from a GPS system. For example, the mobile device P may be located in an area of a bus in which it is prevented from interacting with a GPS system; here, the mobile device P may initiate the location-sharing technique with the objective of indirectly receiving location data from a nearby mobile device which is able to receive signals from the GPS system.

In Stage 1, upon instruction from the user or any other initiating event described above, the leader device P sends a query signal to any mobile device in its vicinity. The scope of inquiry corresponds to the transmission range associated with BLE, e.g., about 100 m. In Stage 2, each mobile device responds by sending a signal that announces its presence, and which may provide its participant ID. In Stage 3, the leader device P assigns the role of location finder to one of the members of the group (including itself as a possible candidate). The leader device P can perform this task by randomly selecting a member.

Assume that the leader P assigns the role of location finder to mobile device Q (404). The leader device P then sends an assignment-bearing signal to the mobile device Q notifying it of its assigned role. In one implementation, the leader device P may optionally notify the mobile device Q of the other members of the group, which correspond to the set of mobile devices that have responded to the leader device P's query signal, and which also include the leader device P. The leader device P may optionally also notify other members of the group of the fact that it has assigned the mobile device Q to the role of location finder. In response to this assignment, the mobile device Q either accepts or rejects its assigned role. In the latter case, the leader device P may attempt to assign the role of location finder to another mobile device, e.g., by randomly selecting another mobile device.

In Stage 4, the mobile device Q proceeds to generate location data (e.g., GPS location data) based on wireless signals received form the external source(s) 108. It then sends this location data to other members of the group via the local communication channel, e.g., as a location-bearing signal. The location-finder device Q can perform this task at any prescribed frequency, e.g., as dictated by the leader device P and/or based on any other environment-specific consideration. More specifically, in one case, the location-finder device Q can publicly broadcast the location data for any mobile device in its range to receive and use, e.g., without necessarily identifying the authorized recipients. In another case, the location-finder device Q can address the location data to only group members, e.g., by specifying a group ID, or individual participation IDs. Further, the location-finder device Q can optionally encrypt the location data, with the expectation that only group members have the key to decode it. Further note that the location-finder device Q can distribute its location data to members of the group through a mesh of local peer-to-peer pathways, rather than using the illustrated star pattern of distribution shown in FIG. 4. For example, the location-finder device Q can send its location data to mobile device R, which can then transfer it to mobile device S, etc.

In another implementation of Stage 3, the leader device P can send a signal to the group which invites one (or more) of the mobile devices to assume the role of location-finder device. Here, the protocol delegates the decision of whether to assume the role of location finder to each mobile device in the group. The first mobile device which accepts the role can transmit a signal notifying all members of the group of its acceptance. Assume that the mobile Q wins this race and sends out the first acceptance-of-role signal. In one implementation, the recipients of this signal can accept the mobile device Q as a winner, and henceforth cease vying for this role. Or one or more of the recipients can still operate as location finders, thus providing supplemental instances of location data to the group.

In another implementation of the first protocol, the communication environment 102 takes the above-described input factors into account when assigning the role of location finder to a mobile device. Here, again assume that the leader corresponds to leader device P. The leader device P may initiate the location-sharing technique based on any circumstance described above.

In Stage 1, the leader device P sends a query signal to any mobile device in its vicinity. In Stage 2, each mobile device that receives the query signal responds by computing a suitability score in the manner described above. The suitability score reflects the mobile device's suitability for serving as the location finder. Each mobile device then sends back a signal to the leader device P which conveys its suitability score. Alternatively, or in addition, each mobile device may send back the raw input factors which influence its suitability score. Alternatively, or in addition, any mobile device that does not wish to take part in the location-sharing technique can refrain from sending back any response to the leader device P. In Stage 3, the leader device P receives all of the responses from neighboring mobile devices. It uses the received suitability scores (and/or raw input factors) to choose mobile device Q as the location-finder mobile device. In one case, the leader P can choose the mobile device Q because it has the highest suitability score. In Stage 4, the mobile device Q proceeds to generate location data and share it with other members of the group via the local communication channel.

In any implementation of the first protocol, a recipient of shared-location data can use its signal verification component 226 to perform any environment-specific consumer-side processing of location data prior to consuming it. For example, the mobile device T can compare the shared location (provided by the location-finder device Q) with its last known location, or a series of its last known locations. If the shared-location data is inconsistent with the mobile device T's expectations, it can reject the shared location, or seek additional verification of the shared location. In addition, or alternatively, the mobile device T can reject the shared-location data if it has an independent basis to question the validity of the sender of the location data. For example, in some implementations, the sender of the location data can append a certificate or other authenticating data to the location data. The mobile device T can reject the shared-location data if it lacks this certificate or authenticating data.

In yet another case, the sender of the location data can generate a hash of the true identity of the sender (here, location-finder device Q). Mobile device T can decode the hash if it has been previously given the key to do so. This will allow mobile device T to determine whether it has a predetermined trusted relationship with the location-finder device Q. Overall, this provision allows a trusted sub-network of users to selectively consume shared-location data from only trusted location-finder mobile devices.

When the recipient mobile device T validates an instance of location data, it can accept the specified location as its own. The location will have a level of uncertainty that depends on the range of the local communication channel (e.g., 100 m for BLUETOOTH) and the uncertainty associated with the location-determination technique applied by the location-finder device Q (e.g., a few meters for GPS). Thus, if the range is 100 m and the uncertainty is 5 m, the error in a location measurement received by a recipient mobile device T can be, at worst, about 105 m. In other implementations, the recipient mobile device T can adjust the received location based on supplemental clues as to the location of the location-finder device Q relative to the mobile device T. These clues may include the strength of the location-bearing signal sent by the location-finder device Q (which has a bearing on the distance of the location-finder device Q from the mobile device T), the direction from which the shared signal is received, etc. For instance, the distance between mobile device Q and mobile device T can be estimated by $d=\alpha(P_{Rx}/\text{txPower})^\beta$, where $P_{Rx}$ is the RSS power of the received signal at the mobile device T, txPower is the power at which mobile device Q transmits the signal (which may be specified in a field of the signal sent by mobile device Q itself), and $\alpha$ and $\beta$ are environment-specific constants. The estimate of distance can be further improved through various techniques to remove the effects of white noise in the received signal. For instance, white noise can be identified by noting the correlation in noise-like signal variations exhibited by plural signals transmitted by plural mobile devices in the vicinity of the mobile device Q. The mobile device T can determine the direction of the signal using known technology, e.g., by using a directional antenna.

The protocol of FIG. 4 can evenly distribute the burden of generating location data by reassigning the role of location finder among the members of the group. For example, the leader device P can reassign the role of location finder based on any rule. In one case, the leader device P uses a round-robin strategy to rotate the role among the members of the group, e.g., by asking each mobile device in rotation to operate as a location finder for a 15 minute "work shift." Alternatively, or in addition, the location-finder device Q can function as a leader device by choosing another location-finder device. In general, the communication environment 102 can provide a more reliable location-providing service by rotating the role of location finder, e.g., because this provision reduces the impact of faulty location readings provided by any given mobile device in the group.

The protocol described in FIG. 4 can handle the departure (or unavailability) of existing members of the group using any environment-specific rules. For example, if any member (besides the leader device P or location-finder device Q) leaves the group, then no action need be taken. That departing device will no longer receive the location data by virtue of it moving out of the range of the location-finder device Q. If the location-finder device Q leaves the group or otherwise fails to perform its role in an acceptable manner, the leader device P can detect the failure to receive location data from this device in a prescribed amount of time. The leader device P can then choose another location-finder device to replace the departed location-finder device Q. If the leader device P leaves the group, then the location-sharing technique can continue as long as the location-finder Q continues to provide location data, or another mobile device independently assumes the role as leader. In some implementations, the leader device P can alert others to its continued membership in the group by sending periodic ping messages.

Further, the protocol of FIG. 4 can handle the arrival of a new mobile device using any environment-specific rules. For example, in one case, a new mobile device that enters the range of the location-finder device Q can automatically receive and use its publicly-shared-location data, by virtue of it being able to detect it. In some implementations, the new mobile device can optionally notify the location-finder device Q and/or the leader device P of its arrival. Or the new mobile device can emit periodical ping messages which provide its participant ID. Upon receipt of these messages, the location-finder device Q and/or the leader device P can automatically add the new mobile device to a list of members of the group. The location-finder device Q can also proactively provide a suitability score which identifies its suitability to assume the role of location finder in the future.

Consider next the scenario in which another leader device attempts to set up a new group within the transmission range of the existing group. For example, assume that mobile device S at the periphery of the existing cluster attempts to establish a new group. The communication environment 102 can handle this scenario in different environment-specific ways. In one approach, the members of the existing group can ignore the invitation of the mobile device S to set up the group, as they are already part of an existing group that is operating satisfactorily. In another implementation, the members of the existing group can join a new group without abandoning their membership in the existing group. Or the members of the existing group can abandon their membership in the existing group Advancing to FIG. 5, this figure shows another protocol for sharing the responsibility of generating location data. In Stage 1, each mobile device determines its suitability score based on the logic described with reference to FIG. 3. In Stage 2, each mobile device compares its suitability score with that of others. Each device can perform this task by broadcasting its suitability score, and inviting others to report back with an indication of whether the transmitted suitability score is higher than their own suitability score. Each transmitting device counts the number of other mobile devices that tell the transmitting device that it has the highest suitability score, to generate a vote score. A mobile device can then declare itself a winner if its vote score is higher than a prescribed number. In other words, a mobile device can declare itself a winner if it discovers that more than a prescribed number of mobile devices in its vicinity consider it a superior choice to assume the role of location finder. In Stage 3, the self-declared winner mobile device(s) can begin operating as location-finder device(s). Here, mobile devices Q and S have declared themselves winners, and therefore begin operating as location-finder devices. Note that, in this protocol, some mobile devices in the group may receive location data from two or more location-finder devices. A recipient of two or more instances of location data can consume this data in any environment-specific way, such as by picking a location that is midway between the two or more instances of location data, by selecting the most reliable instance of location data, etc.

FIG. 6 shows a protocol that does not involve the formal establishment of a group. Nor does it require the involvement of a leader device. In this sense, it can be considered a leaderless allocation strategy. In Stage 1, each mobile device continually determines it suitability score. Its score depends on any of the input factors described above in connection with FIG. 3. In addition, each mobile device decrements its suitability score by an amount that is inversely proportional to the length of time since it last generated its own location data. More specifically, the mobile device will discount the suitability score by an amount X if it generated its own location data (e.g., based on GPS signals) one minute ago, and discount the suitability score by an amount Y if it generated its own location data ten minutes ago, where X>Y. This will have the net effect of disfavoring the use of any mobile device that has just served the role of location finder. But as time elapses, the suitability score of this same mobile device will raise, since the length of time since it last served as location finder increases. Optionally, each mobile device can also take into consideration the amount of time since it last received shared-location data from another mobile device.

In Stage 2, each mobile device generates it next location data at a timing which depends on its suitability score. As such, a mobile device with a high suitability score may determine its location data at a rate that is greater than a mobile device with a lower suitability score. In Stage 3, each mobile device that has determined its location data shares it with others in its vicinity. Each mobile device can optionally perform this task without knowledge of what mobile devices (if any) may receive the location data. In this case, the notion of a group is implicit; the group constitutes that set of mobile devices that receive a location-finder device's shared-location data at any given time. As in the second protocol, a recipient mobile device can process two or more instances of location data based on any environment-specific rules, such as by selecting a location that lies between the shared locations, selecting the most reliable location, etc.

In a yet more streamlined leaderless protocol, any mobile device (say, for example, mobile device Q) can proactively assume the role of location finder, e.g., without the establishment of a leader device, and without assessing its fitness to assume the role of location finder. The recipients of the location data sent by the location-finder device Q can hold off forming another group as long as they are receiving reliable location data from the location-finder device Q.

The above-described three strategies are described in the spirit of illustration, not limitation. Other implementations can establish groups and assign roles in other ways. As a general point, note that all three of the above-described protocols do not rely on remote logic to manage the operation of the location-sharing technique. This characteristic is beneficial particularly in those circumstances in which a remote service cannot be accessed for any reason (e.g., because the mobile devices are outside the range of cell phone towers, or there is some obstacle or condition in the environment which blocks reception of signals provided by the cell phone towers). This approach also efficiently consumes power, as it avoids the exchange of signals with a communication system for the purpose of managing a group. (This is based on the presumption that the local exchange of signals requires less energy than the cell-based exchange of signals.)

Nevertheless, other implementations may rely on a remote service to assist in the management of the location-sharing technique, to varying extents. For example, a remote service can receive the suitability scores generated by each mobile device and then use a clustering algorithm to assign at least some of the mobile devices to respective groups of mobile devices. The mobile devices can also exchange coordinating messages among themselves via the communication system(s) 104.

B. Illustrative Processes

Figure 9:
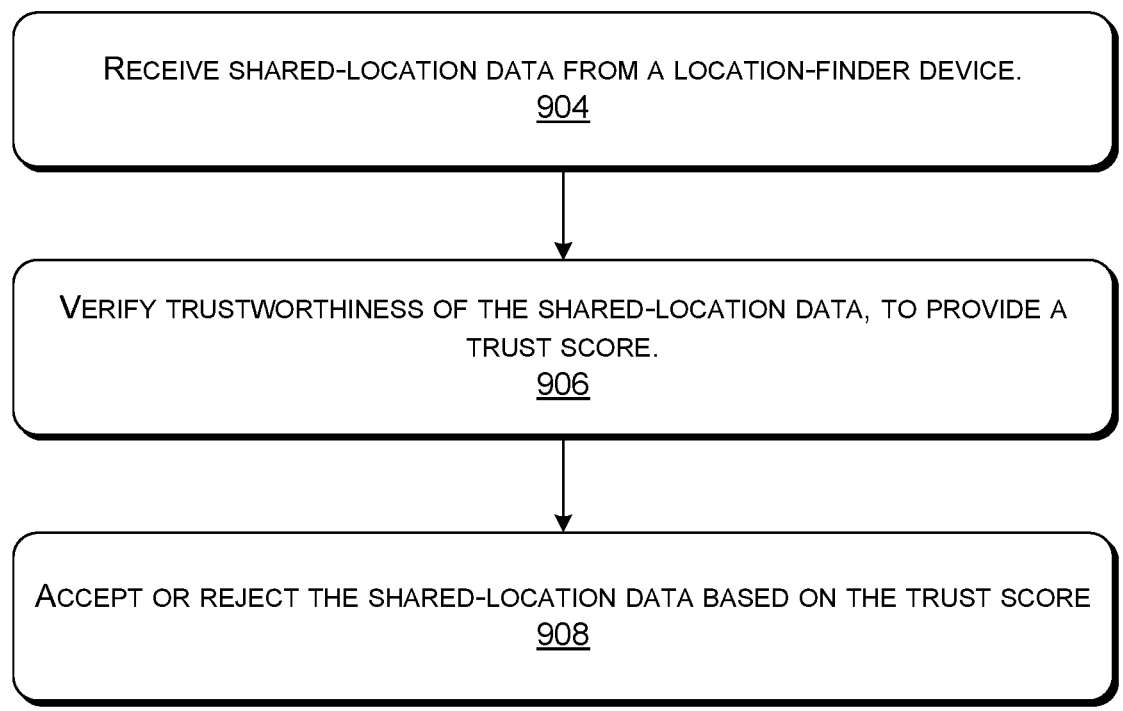
FIG. 9 is a flowchart that shows one manner by which a mobile computing device can process shared-location data received from a location-finder mobile computing device.

FIGS. 7-9 show processes that explain the operation of the communication environment 102 of Section A in flowchart form. Since the principles underlying the operation of the communication environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 7 shows a process 702 that describes one manner of operation of a leader mobile computing device ("leader device"). The leader device manages a group of mobile computing devices ("mobile devices"). The process 702 is optional because the use of a leader device itself is optional. In block 704, the leader device interacts with other members of the group of mobile devices to receive information regarding suitability of the other members to function as the location-finder device. In block 706, the leader device makes an assignment which selects the location-finder device based on the information that is received. In block 708, the leader device controls a communication mechanism of the leader device to transmit an assignment-bearing signal to the chosen location-finder device using a local communication channel, which informs the location-finder device of the assignment.

FIG. 8 shows a process 802 that describes one manner of operation of a location-finder mobile computing device ("location-finder device"). The location-finder device is a mobile computing device that has been assigned the task of generating location data on behalf of other members of a group of mobile devices. In block 804, the location-finder device receives an assignment which causes the location-finder device to begin determining its location on behalf of members of a spatially-clustered group of mobile devices, of which the location-finder device is one member. The members of the group of mobile devices lie within a transmission range associated with a local communication channel used by the members to communicate with each other. Block 804 may involve receiving the assignment from another mobile device in the group (e.g., from a leader device). Or block 804 may refer to an operation by which the location-finder device determines its own assignment.

In block 806, the location-finder device generates location data based on signals received from one or more external sources (such as a GPS system). In block 808, the location-finder device controls a communication mechanism of the location-finder device to transmit a location-bearing signal to other members of the group of mobile devices using the local transmission channel, the location-bearing signal conveying the location data. Each of the other members uses the location data received from the location-finder device in lieu of independently determining location data based on signals received from the one or more external sources. Further, each of the other members consumes less power by virtue of use of the location data received from the location-finder device, compared to an amount of power that would be otherwise consumed by independently determining the location data.

FIG. 9 shows a process 902 that describes one manner by which any mobile device can process shared-location data received from a location-finder device. That is, note that any mobile device can operate as a provider or consumer of shared-location data. FIG. 9 explains the operation of any mobile device in the role of consumer. In block 904, the mobile device receives the shared-location data from a location-finder device. In block 906, the mobile device verifies trustworthiness of the shared-location data, to provide a trust score. In block 908, the mobile device accepts or rejects the shared-location data based on the trust score.

C. Representative Computing Device

Figure 10:
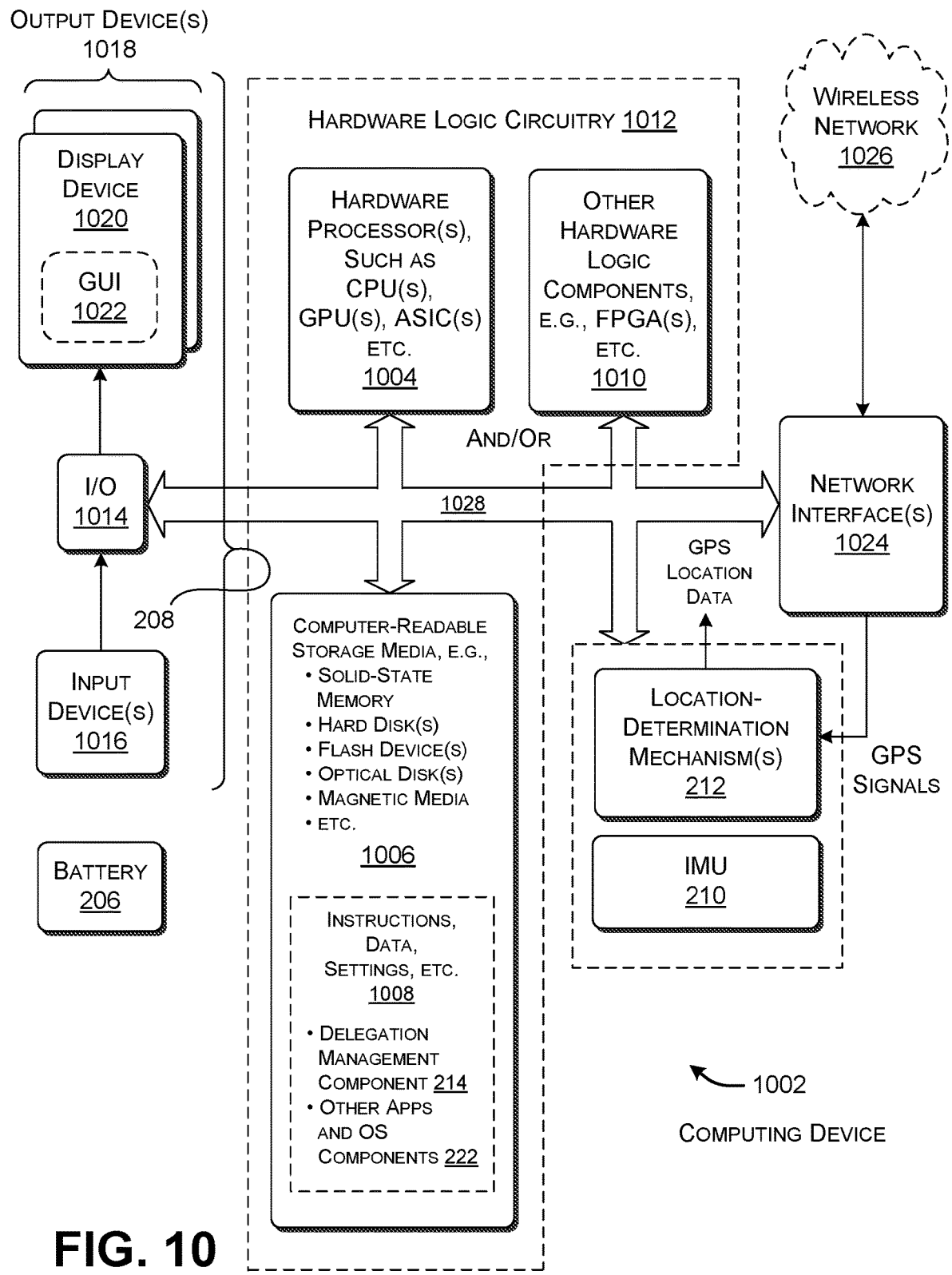
FIG. 10 shows illustrative device hardware that can be used to implement any aspect of the features shown in the foregoing drawings.

FIG. 10 shows a computing device 1002 that can be used to implement any aspect of the mechanisms set forth in the above-described figures. For instance, with reference to FIG. 2, the type of computing device 1002 shown in FIG. 10 can be used to implement the mobile device 202. Or the type of computing device 1002 can be used to implement any server provided by the communication systems 104 or the optional support service system(s) 106. In all cases, the computing device 1002 represents a physical and tangible processing mechanism.

The computing device 1002 can include one or more hardware processors 1004. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1002 can also include computer-readable storage media 1006, corresponding to one or more computer-readable media hardware units. The computer-readable storage media 1006 retains any kind of information 1008, such as machine-readable instructions, settings, data, etc. Without limitation, for instance, the computer-readable storage media 1006 may include one or more solid-state devices, one or more magnetic hard disks, one or more optical disks, magnetic tape, and so on. Any instance of the computer-readable storage media 1006 can use any technology for storing and retrieving information. Further, any instance of the computer-readable storage media 1006 may represent a fixed or removable component of the computing device 1002. Further, any instance of the computer-readable storage media 1006 may provide volatile or non-volatile retention of information.

The computing device 1002 can utilize any instance of the computer-readable storage media 1006 in different ways. For example, any instance of the computer-readable storage media 1006 may represent a hardware memory unit (such as Random Access Memory (RAM)) for storing transient information during execution of a program by the computing device 1002, and/or a hardware storage unit (such as a hard disk) for retaining/archiving information on a more permanent basis. In the latter case, the computing device 1002 can also include one or more drive mechanisms (not shown) for storing and retrieving information from an instance of the computer-readable storage media 1006.

The computing device 1002 may perform any of the functions described above when the hardware processor(s) 1004 carry out computer-readable instructions stored in any instance of the computer-readable storage media 1006. For instance, the computing device 1002 may carry out computer-readable instructions to perform each block of the processes described in Section B.

Alternatively, or in addition, the computing device 1002 may rely on one or more other hardware logic components 1010 to perform operations using a task-specific collection of logic gates. For instance, the hardware logic component(s) 1010 may include a fixed configuration of hardware logic gates, e.g., that are created and set at the time of manufacture, and thereafter unalterable. Alternatively, or in addition, the other hardware logic component(s) 1010 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 10 generally indicates that hardware logic circuitry 1012 includes any combination of the hardware processor(s) 1004, the computer-readable storage media 1006, and/or the other hardware logic component(s) 1010. That is, the computing device 1002 can employ any combination of the hardware processor(s) 1004 that execute machine-readable instructions provided in the computer-readable storage media 1006, and/or one or more other hardware logic component(s) 1010 that perform operations using a fixed and/or programmable collection of hardware logic gates. More generally stated, the hardware logic circuitry 1012 corresponds to one or more hardware logic components of any type(s) that perform operations based on logic stored in and/or otherwise embodied in the hardware logic component(s).

In some cases (e.g., in the case in which the computing device 1002 represents a user computing device), the computing device 1002 also includes an input/output interface 1014 for receiving various inputs (via input devices 1016), and for providing various outputs (via output devices 1018). Illustrative input devices include a keyboard device, a mouse input device, a touchscreen input device, a digitizing pad, one or more static image cameras, one or more video cameras, one or more depth camera systems, one or more microphones, a voice recognition mechanism, and so on. One particular output mechanism may include a display device 1020 and an associated graphical user interface presentation (GUI) 1022. The display device 1020 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on.

The computing device 1002 also includes one or more default location-determination mechanisms 212 for generating location data based on signals received from the external source(s) 108. For example, one such location-determination mechanism can provide GPS location data based on received GPS signals. An inertial measurement unit (IMU) 210 generates motion signals using one or more accelerometers, one or more gyroscopes, one or more magnetometers, etc.

The computing device 1002 can also include one or more network interfaces 1024 for exchanging data with other devices via one or more communication conduits 1026. The network interface(s) 1024 can include the communication mechanism(s) 204 described in FIG. 2. The communication conduit(s) 1026 can encompass a wireless network implemented by the communication system(s) 104. More generally, the communication conduit(s) 1026 can include any combination of hardwired links, wireless links, routers, gateway functionality, name servers, etc., governed by any protocol or combination of protocols.

One or more communication buses 1028 communicatively couple the above-described components together. A battery 206 and/or other power source provides power to all of the above-described components.

FIG. 10 shows the computing device 1002 as being composed of a discrete collection of separate units. In some cases, the collection of units may correspond to discrete hardware units provided in a computing device chassis having any form factor. In other cases, the computing device 1002 can include a hardware logic component that integrates the functions of two or more of the units shown in FIG. 1. For instance, the computing device 1002 can include a system on a chip (SoC or SOC), corresponding to an integrated circuit that combines the functions of two or more of the units shown in FIG. 10.

The following summary provides a non-exhaustive set of illustrative aspects of the technology set forth herein.

According to a first aspect, a mobile computing device is described that includes: a communication mechanism for transmitting and receiving wireless signals; a battery for supplying power to the mobile computing device; and hardware logic circuitry. The hardware logic circuitry corresponds to: (a) one or more hardware processors that perform operations by executing machine-readable instructions stored in a memory, and/or (b) one or more other hardware logic components that perform operations using a task-specific collection of logic gates. The operations includes receiving an assignment which causes the mobile computing device to begin determining its location on behalf of members of a spatially-clustered group of mobile computing devices, of which the mobile computing device is one member. The members of the group of mobile computing devices lie within a transmission range associated with a local communication channel used by the members to communicate with each other. The operations further include: generating location data based on signals received from one or more external sources; and controlling the communication mechanism to transmit a location-bearing signal to other members of the group of mobile computing devices using the local transmission channel, the location-bearing signal conveying the location data. Each of the other members use the location data received from the mobile computing device in lieu of independently determining location data based on signals received from the external source(s). Each of the other members consume less power by virtue of use of the location data received from the mobile computing device, compared to an amount of power that would be otherwise consumed by independently determining the location data. One or more mobile computing devices establish the group and determine the assignment.

According to a second aspect, the assignment is received from another mobile computing device in the group, that other mobile computing device operating as a leader mobile computing device of the group. The leader mobile computing device determines the assignment based on prior interaction with the members of the group.

According to a third aspect, the mobile computing device determines the assignment itself.

According to a fourth aspect, membership of the group is defined through exchange of signals among the members of the group.

According to a fifth aspect, the membership of the group is implicitly defined to include those mobile computing devices which can receive the location-bearing signal that conveys the location data.

According to a sixth aspect, the assignment is based on a consideration of: an extent to which the mobile computing device relies on location data to perform one or more functions associated with the mobile computing device, and a kind of location data that the mobile computing device relies on in performing the function(s).

According to a seventh aspect, the assignment is based on one or more of: reliability of location data generated by the mobile computing device; and/or a current power level of the mobile computing device; and/or device limitations and/or constraints associated with the mobile computing device; and/or user preference information describing an extent to which a user associated with the mobile computing device permits the mobile computing device to share location data with other mobile computing devices; and/or an amount of time that the mobile computing device has been a member of the group; and/or an amount of time that has transpired since the mobile computing device last determined its location.

According to an eighth aspect, the location-bearing signal does not reveal an identity of a user associated with the mobile computing device.

According to a ninth aspect, wherein the mobile computing device also operates as a consumer of shared-location data provided by another mobile computing device, that other mobile computing device operating as a location-finder mobile computing device. In a context of operating as a consumer of shared-location data, the hardware logic circuitry performs operations of: receiving the shared-location data from the location-finder mobile computing device; verifying trustworthiness of the shared-location data, to provide a trust score; and accepting or rejecting the shared-location data based on the trust score.

According to a tenth aspect, dependent on the ninth aspect, the verifying of trustworthiness depends on an extent to which the location-finder mobile computing device is known to the mobile computing device which consumes location data provided by the location-finder mobile computing device.

According to an eleventh aspect, dependent on the ninth aspect, the verifying of trustworthiness depends on an assessed consistency of the shared-location data with prior expectations regarding location.

According to a twelfth aspect, on another occasion, the mobile computing device operates as a leader mobile computing device. While acting as a leader mobile computing device, the hardware logic circuitry performs operations of: determining a new assignment, the new assignment instructing another mobile computing device to generate location data; and transmitting an assignment-bearing signal conveying the new assignment to the other mobile computing device.

According to a thirteenth aspect, a method is described, implemented by a mobile computing device, in which the mobile device can operate in a role of a location-finder mobile computing device and a consumer of shared location data. In the role as a location-finder, the mobile computing device: receives an assignment which causes the mobile computing device to begin determining its location on behalf of members of a spatially-clustered group of mobile computing devices, of which the mobile computing device is one member. The members of the group of mobile computing devices lie within a transmission range associated with a local communication channel used by the members to communicate with each other. The mobile computing device also: generates location data based on signals received from one or more external sources; and controls a communication mechanism to transmit a location-bearing signal to other members of the group of mobile computing devices using the local transmission channel, the location-bearing signal conveying the location data. Each of the other members use the location data received from the mobile computing device in lieu of independently determining location data based on signals received from the external source(s). Further, each of the other members consume less power by virtue of use of the location data received from the mobile computing device, compared to an amount of power that would be otherwise consumed by independently determining the location data. In the role as a consumer of shared-location data, the mobile computing device: receives the shared-location data from another location-finder mobile computing device; verifies trustworthiness of the shared-location data, to provide a trust score; and accepts or rejects the shared-location data based on the trust score.

According to a fourteenth aspect, dependent on the thirteenth aspect, the assignment is based on a consideration of at least: an extent to which the mobile computing device relies on location data to perform one or more functions associated with the mobile computing device; and a kind of location data that the mobile computing device relies on in performing the function(s).

According to a fifteenth, dependent on the thirteenth aspect, the verifying of trustworthiness depends on an extent to which the location-finder mobile computing device that sent the shared-location data is known.

According to a sixteenth aspect, dependent on the thirteenth aspect, the verifying of the trustworthiness depends on an assessed consistency of the shared-location data with prior expectations regarding location.

According to a seventeenth aspect, a system of two or more mobile computing devices is described. The system includes at least a leader mobile computing device and a location-finder mobile computing device, the leader mobile computing device and the location-finder mobile computing device being members of a group of mobile computing devices. The members of the group of mobile computing devices lie within range of signals transmitted by any member to any other member of the group using a local communication channel. The leader mobile computing device includes hardware logic circuitry configured to: interact with other members of the group of mobile computing devices to receive information regarding suitability of the other members to function as the location-finder mobile computing device; make an assignment which selects the location-finder mobile computing device based on the information that is received; and control a communication mechanism of the leader mobile computing device to transmit an assignment-bearing signal to the location-finder mobile computing device using the local communication channel, which informs the location-finder mobile computing device of the assignment. The location-finder mobile computing device has hardware logic circuitry configured to: control a communication mechanism of the location-finder computing device to receive the assignment-bearing signal; generate location data based on signals received from one or more external sources; and control the communication mechanism of the location-finder computing device to transmit a location-bearing signal to other members of the group of mobile computing devices using the local transmission channel, the location-bearing signal conveying the location data.

According to an eighteenth aspect, dependent on the seventeenth aspect, the assignment is based on an extent to which each mobile computing device in the group relies on location data to perform one or more functions; and a kind of location data that each mobile computing device relies on in performing the function(s).

According to a nineteenth aspect, dependent on the seventeenth aspect, each mobile computing device also operates as a consumer of shared-location data provided by another location-finder mobile computing device. In a role as consumer, the hardware logic circuitry of each mobile computing device performs operations of: receiving the shared-location data from the other location-finder mobile computing device; verifying trustworthiness of the shared-location data, to provide a trust score; and accepting or rejecting the shared-location data based on the trust score.

According to a twentieth aspect, dependent on the nineteenth aspect, the verifying of the shared-location data depends, at least in part, on: an extent to which the other location-finder mobile computing device is known to the mobile computing device which consumes location data provided by the other location-finder mobile computing device; and/or an assessed quality and/or consistency associated with the shared-location data.

A twenty-first aspect corresponds to any combination (e.g., any logically-consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile computing device, comprising:
  a communication mechanism for transmitting and receiving wireless signals;
  a battery for supplying power to the mobile computing device; and
  hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates, the operations including:
  receiving an assignment which causes the mobile computing device to begin determining its location on behalf of members of a spatially-clustered group of mobile computing devices, of which the mobile computing device is one member,
  the members of the group of mobile computing devices lying within a transmission range associated with a local communication channel used by the members to communicate with each other;
  generating location data based on signals received from one or more external sources; and
  controlling the communication mechanism to transmit a location-bearing signal to other members of the group of mobile computing devices using the local transmission channel, the location-bearing signal conveying the location data,
  wherein the mobile computing device also operates as a consumer of shared-location data provided by another mobile computing device, that other mobile computing device operating as a location-finder device, and
  wherein, in a context of operating as a consumer of shared-location data, the hardware logic circuitry performs operations of:
  receiving the shared-location data from the location-finder device; and
  using the shared-location data received from the location-finder device in lieu of independently determining location data based on signals received from said one or more external sources,
  the mobile computing device consuming less power by virtue of use of the shared-location data received from the location-finder device, compared to an amount of power that would be otherwise consumed by independently determining location data,
  wherein one or more mobile computing devices establish the group and determine the assignment, and
  wherein the hardware logic circuitry also includes a logic component that performs a function based on location data, and wherein the assignment is based, at least in part, on an input factor that specifies a location requirement of the logic component.

2. The mobile computing device of claim 1,
  wherein the assignment is received from another mobile computing device in the group, that other mobile computing device operating as a leader device of the group, and
  wherein the leader device determines the assignment based on prior interaction with the members of the group.

3. The mobile computing device of claim 1, wherein the input factor that specifies a location requirement is based on a consideration of: an extent to which the logic component relies on location data to perform the function, and a kind of location data that the logic component relies on in performing the function.

4. The mobile computing device of claim 3,
  wherein said extent to which the logic component relies on location data refers, at least in part, to a frequency at which the mobile computing device requires the location data, and
  wherein the kind of location data refers, at least in part, to a precision of the location data required by the logic component.

5. The mobile computing device of claim 1, wherein the assignment is also based on one or more of:
  reliability of location data generated by the mobile computing device; and/or
  a current power level of the mobile computing device; and/or
  device limitations and/or constraints associated with the mobile computing device; and/or
  user preference information describing an extent to which a user associated with the mobile computing device permits the mobile computing device to share location data with other mobile computing devices; and/or
  an amount of time that the mobile computing device has been a member of the group; and/or
  an amount of time that has transpired since the mobile computing device last determined its location.

6. The mobile computing device of claim 1, wherein the location-bearing signal does not reveal an identity of a user associated with the mobile computing device.

7. The mobile computing device of claim 1,
wherein, in a context of operating as a consumer of shared-location data, the hardware logic circuitry further performs operations of:
verifying trustworthiness of the shared-location data, to provide a trust score; and
accepting or rejecting the shared-location data based on the trust score,
said verifying being based, at least in part on an amount of time that the location-finder device has been a member of the group.

8. The mobile computing device of claim 1, wherein, on another occasion, the mobile computing device operates as a leader device, and wherein, while acting as a leader device, the hardware logic circuitry performs operations of:
determining a new assignment, the new assignment instructing another mobile computing device to generate location data; and
transmitting an assignment-bearing signal conveying the new assignment to the other mobile computing device.

9. The mobile computing device of claim 1, wherein the assignment is also based on an indication of whether the logic component is currently running.

10. The mobile computing device of claim 1, wherein the assignment is also based on a level of importance attributed to the logic component.

11. The mobile computing device of claim 1, wherein the assignment is determined by computing a score based on one or more input factors.

12. The mobile computing device of claim 1, wherein the assignment is also based on an amount of time that the mobile computing device has been a member of the group.

13. The mobile computing device of claim 1, wherein the assignment is also based on an indication of whether or not the mobile computing device is moving in unison with other members of the group.

14. A method, performed by a mobile computing device, comprising:
in a role as a location-finder device:
receiving an assignment which causes the mobile computing device to begin determining its location on behalf of members of a spatially-clustered group of mobile computing devices, of which the mobile computing device is one member, the assignment being based, at least in part, on a consideration of a location requirement of a function provided by the mobile computing device:
the members of the group of mobile computing devices lying within a transmission range associated with a local communication channel used by the members to communicate with each other;
generating location data based on signals received from one or more external sources; and
controlling a communication mechanism to transmit a location-bearing signal to other members of the group of mobile computing devices using the local transmission channel, the location-bearing signal conveying the location data,
each of the other members using the location data received from the mobile computing device in lieu of independently determining location data based on signals received from said one or more external sources, and
each of the other members consuming less power by virtue of use of the location data received from the mobile computing device, compared to an amount of power that would be otherwise consumed by independently determining the location data, and
in a role as a consumer of shared-location data:
receiving the shared-location data from another location-finder device;
verifying trustworthiness of the shared-location data, to provide a trust score;
accepting or rejecting the shared-location data based on the trust score; and
using the shared-location data received from the other location-finder device as a proxy for location data that is independently determined by the mobile computing device based on sionals received from said one or more external sources.

15. The method of claim 14, wherein the location requirement specifies:
an extent to which the mobile computing device relies on location data to perform the function; and
a kind of location data that the mobile computing device relies on in performing the function.

16. A system of two or more mobile computing devices, including:
at least a leader device and a location-finder device, the leader device and the location-finder device being members of a group of mobile computing devices,
the members of the group of mobile computing devices lying within range of signals transmitted by any member to any other member of the group using a local communication channel,
the leader device including hardware logic circuitry configured to:
interact with other members of the group of mobile computing devices to receive information regarding suitability of the other members to function as the location-finder device, the information specifying, in part location requirements of functions performed by the other members;
make an assignment which selects the location-finder device based on the information that is received; and
control a communication mechanism of the leader mobil device to transmit an assignment-bearing signal to the location-finder device using the local communication channel, which informs the location-finder device of the assignment; and
the location-finder device having hardware ogic circuitry configured to:
control a communication mechanism of the location-finder device to receive the assignment-bearing signal;
generate location data based on signals received from one or more external sources; and
control the communication mechanism of the location-finder device to transmit a location-bearing signal to other members of the group of mobile computing devices using the local transmission channel, the location-bearing signal conveying the location data.

17. The system of claim 16, wherein the location requirements specify an extent to which each mobile computing device in the group relies on location data to perform one or more functions; and a kind of location data that each mobile computing device relies on in performing said one or more functions.

18. The system of claim 16, wherein at least one mobile computing device in the group operates as a consumer device that consumes shared-location data provided by the location-finder device; and wherein, in a role as consumer, the hardware logic circuitry of the consumer device performs operations of:
- receiving the shared-location data from the location-finder device;
- verifying trustworthiness of the shared-location data, to provide a trust score; and
- accepting or rejecting the shared-location data based on the trust score,
- said verifying being based, at least in part, on an amount of time that the location-finder device has been a member of the group.

\* \* \* \* \*